United States Patent [11] 3,553,390

[72] Inventor Gerhard Krause
Darmstadt, Germany
[21] Appl. No. 667,879
[22] Filed Sept. 12, 1967
[45] Patented Jan. 5, 1971
[73] Assignee Fenseh G.m.b.H.
Darmstadt, Germany
a corporation of Germany
[32] Priority Sept. 17, 1966
[33] Germany
[31] No. F50223

[54] CIRCUIT ARRANGEMENT FOR SUPPRESSING SWITCH TRANSIENTS IN DEVICES FOR THE MAGNETIC STORAGE OF VIDEO SIGNALS EMPLOYING A PLURALITY OF MAGNETIC HEADS
4 Claims, 3 Drawing Figs.

[52] U.S. Cl. 178/100.2, 178/6.6; 340/174.1
[51] Int. Cl. G11b 5/52, H04n 5/78
[50] Field of Search 179/100.2T, B; 178/6.6A, HS; 340/174.1D

[56] References Cited
UNITED STATES PATENTS

| | | | |
|---|---|---|---|
| 2,996,576 | 8/1961 | Dolby | 178/6.6 |
| 3,099,708 | 7/1963 | Smith | 178/6.6 |
| 3,346,702 | 10/1967 | Heizer et al | 178/6.6X |

FOREIGN PATENTS

| | | | |
|---|---|---|---|
| 931,525 | 7/1963 | Great Britain | 178/6.6 |

*Primary Examiner*—Bernard Konick
*Assistant Examiner*—Raymond F. Cardillo, Jr.
*Attorney*—Ernest F. Marmorek

ABSTRACT: In a system for magnetically storing video signal segments in transverse tracks on a magnetic tape, and for detecting and reproducing those recorded signals into a continuous signal by angularly spaced magnetic heads arranged on the periphery of a rotating wheel, a circuit to suppress the effects of interference impulse signals developed during switching from one head to the other bypassing the combined signal from the several heads in operating sequence through a delay line which can be bypassed by a switch. The delay line delays the signal for an interval slightly longer than the duration of the interference impulse and during that delay the undelayed signal is transmitted through the direct bypass switch around the delay line, whereby the interference impulse signal expires in the delay line.

PATENTED JAN 5 1971 3,553,390

Inventor:
Gerhard Krause
by
His Attorney.

CIRCUIT ARRANGEMENT FOR SUPPRESSING SWITCH TRANSIENTS IN DEVICES FOR THE MAGNETIC STORAGE OF VIDEO SIGNALS EMPLOYING A PLURALITY OF MAGNETIC HEADS

The invention relates to a circuit for eliminating switching transients in devices for the magnetic storage of video signals, in which the video signal is recorded in transverse tracks of a magnetic tape by means of magnetic heads arranged on the periphery of a rotating head wheel, and the partially overlapping signal portions taken from the transverse tracks are combined by switches within the overlap periods and in the blanking periods of the video signal to form a continuous video signal.

It has been shown that the switching can cause interference impulses which impair the perfect operation of the installation. More particularly, the switching impulses affect the function of the control circuits for the rotational speed of the head wheel and the running speed of the magnetic tape, as well as the electronic time error compensation, and the interference impulses are also visible in the oscillogram of the video signal and in the control picture of the display and signal monitors.

In a circuit arrangement in devices for the magnetic storage of video signals, in which the video signal is recorded in transverse tracks of a magnetic tape by means of magnetic heads arranged on the periphery of a rotating head wheel, and the partly overlapping signal portions taken from the transverse tracks are combined by switches within the overlap times and in the blanking times of the video signal to form a continuous video signal, the combined video signal is applied, according to the invention, to a delay line which delays the video signal at least by the duration of the interference impulse, and with the occurrence of the interference impulse in the output of the delay line, the undelayed video signal is added to this output at least for the duration of the interference impulse.

One object of this invention is to provide a video signal detection and reproduction system in which the harmful effects of switching transients are eliminated.

Another object of this invention is to provide a video signal detection and reproduction system in which the switches transients are led through a delay line circuit in which they are dissipated while signal continuity is otherwise maintained.

The circuit according to the invention is distinguished by its special simplicity. It also operates in the case of short-duration failures of the signal due to faults in the magnetic tape (dropouts), with sudden changes of the mean value of the video signal, with noise and with cuts of the magnetic tape, and during the starting up of the apparatus.

Further objects and advantages of the invention will be set forth in part in the following specification and in part will be obvious therefrom without being specifically referred to, the same being realized and attained as pointed out in the claims hereof.

For a fuller understanding of the nature and objects of the invention reference should be had to the following detailed description, taken in connection with the accompanying drawings, in which.

Figure 1:
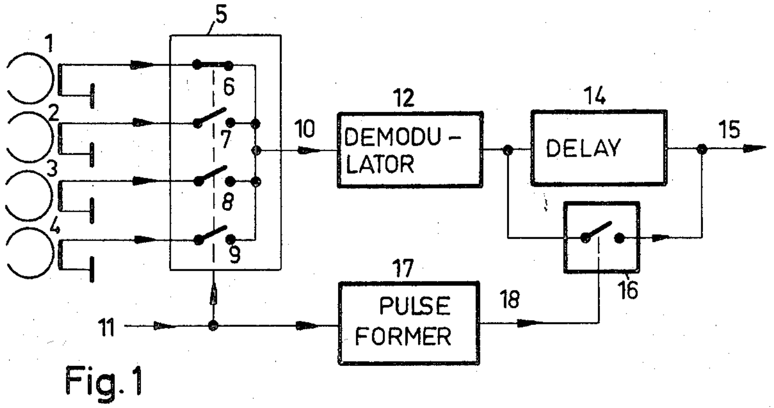
FIG. 1 is a block diagram of a device for the magnetic recording and reproducing of video signals, with the parts which are not necessary for the understanding of the invention having been omitted.

In carrying the invention into effect in one of the embodiments which has been selected for illustration in the accompanying drawings and for description in this specification, and referring now particularly to FIG. 1, there are shown magnetic heads 1, 2, 3, 4 of a video tape recorder, arranged on the periphery of a rotating head wheel spaced at equal angular distances. The magnetic heads 1—4 scan successively the transverse tracks of a magnetic tape (not shown) on which the video signal is stored. By means of a switching device 5, the signal portions taken by the magnetic heads 1—4 are combined to form a continuous video signal. To this end, the magnetic heads 1 to 4, each of which scans a transverse track, are connected by means of switches 6, 7, 8, 9 with the output lead 10. The switches 6—9 are operated by a sequence of impulses applied to the circuit at 11. The switching is effected during the overlap times of the signal portions supplied by two consecutive magnetic heads within the line blanking interval of the video signal. The switches 6 to 9, represented by their symbols, are electronic switches. From the recorded frequency modulated signal, the video signal is reproduced by means of a demodulator 12.

The video signal now reaches a delay line 14 whose delay is slightly larger than the width of the switching impulse. The delay may be, for example, 300 nanoseconds. When the switch 16 is closed, the signal passes from the input of the delay line without delay to the output 15 of the circuit, whereas while the switch 16 is open, the signal is delayed by about the duration of the switching impulse before it reaches the output 15. The switch 16 is operated by a switching pulse which is derived from a pulse former 17 energized from the same clock impulse train applied to the switching device 5 at 11.

Figure 2:
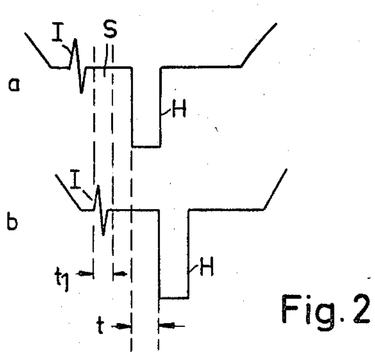
FIG. 2 is a graph that shows the video signal in the vicinity of the blanking interval.

FIG. 2 shows diagrammatically a section of the video signal in the vicinity of the line blanking interval. Within that line blanking interval, the horizontal sync pulse H is transmitted. Before and after the horizontal sync pulse, the signal has black value. FIG. 2*a* shows the signal at the input. FIG. 2*b* shows the signal at the output of the delay line 14, shifted relative to the signal at the input in time by a period $t$. This period $t$ is made somewhat longer than the duration of the interference impulse I caused by the switching, and it has been assumed that the switching from one magnetic head to the next is effected on the front porch during the line blanking interval. During the occurrence of the interference impulse I in the signal at the output of the delay line 14 (FIG. 2*b*) the switch 16 is closed during a period $t_1$, which is somewhat longer than the duration of the interference impulse I. For the duration of the switching impulse, therefore, the immediately following section S of the front porch is inserted into the output signal instead of the switching impulse I.

Figure 3:
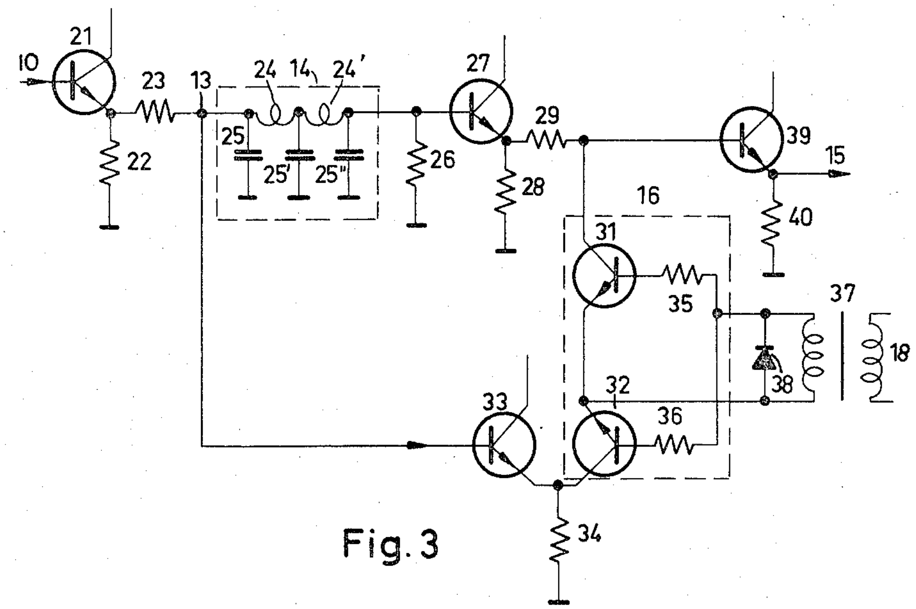
FIG. 3 is a wiring diagram which shows a practical embodiment of the circuit arrangement.

In a practical embodiment of the circuit, shown in FIG. 3, the demodulated video signal passes from the line 10 to the base of a transistor 21, acting as an impedance transformer, and having an emitter resistance 22. Connected to the emitter of the transistor 21 through a resistor 23 is the input 13 of the delay line 14. The delay line 14 consists of a number of series inductances and parallel spaced capacitances, of which the drawing shows only two inductances 24,24′, and three capacitances 25,25′,25″. The input resistance of the delay line 14, formed by the emitter-side output resistance of the transistor 21 and the resistor 23, as well as the output resistance 26 of the delay line is adapted to the characteristic impedance of the delay line. The signal, delayed by the delay line reaches the base of a further transistor 27, connected as an impedance transformer and having an emitter resistance 28.

The switch 16 is formed by the series connected emitter-collector paths of two further transistors 31 and 32. The input 13 of the delay line 14 is connected to the base of a transistor 33, working as an impedance transformer, from whose emitter junction, with the emitter resistance 34, the undelayed signal is applied to the collector of the transistor 32. The switching transistors 31 and 32 can be moved from the blocked state into the conducting state by means of a switching impulse applied to their bases through resistors 35 and, respectively, 36. The switching impulse from an impulse generator 18 is transitted to the bases of the transistors 31 and 32 through a transformer 37 whose secondary winding is bridged by a diode 38.

So long as the transistors 31 and 32 are blocked, the video signal passes from the input 10 via the transistor 21, the resistor 23, the delay line 14 and the transistor 27 from the emitter of this transistor through a further resistor 29 to a transistor 39, and from its emitter junction with the emitter resistance 40 to the output lead 15. If an interference impulse occurs in the signal delayed by the delay line 14, the transistors 31 and 32 are made conducting by a switching impulse applied at 18 and the undelayed signal is thereby transitted from the input 13 of the delay line 14 through the transistor 33 and the switching transistors 32 and 31 to the base of the transistor 39. The resistance of this signal path is substantially smaller than the value of the resistance 29 so that a practically undelayed signal passes to the base of the transistor 39.

I wish it to be understood that I do not desire to be limited to the exact details of construction shown and described, for obvious modifications will occur to a person skilled in the art.

I claim:

1. A video signal system in which video signals are sequentially stored in transverse tracks on an elongated magnetic tape, and then detected and reproduced by magnetic heads sequentially arranged on the periphery of a rotating wheel, with the tracks arranged to provide partial overlap of signals reproduced from said tracks, comprising:
 - switching means operated by a switching pulse for sequentially combining the signals from said detecting and reproducing heads; said switching means giving rise to interference signals during the period of said switching pulse; an output circuit;
 - delay line means for conducting and delaying said combined signals from said switching means to said output circuit; said delay being for a period slightly larger than the period of the switching pulse;
 - bypass circuit means for conducting said combined signals directly to said output circuit without delay and around said delay line means during the interval of said interference signal; and
 - timing means for controlling said switching means by said switching pulse for combining the head signals, and for synchronously controlling said bypass circuit means to bypass said combined signal around said delay line to said output circuit during the interval of said interference signal to maintain signal continuity in said output circuit while interference impulse signals generated at the track discontinuities are permitted to expire in the delay line.

2. A video signal system, as in claim 1, in which said switching means, for combining signals from said detecting heads, include separate switching means for each detecting head, and said separate switching means are time controlled by said timing means for sequentially combining the signals detected from said tracks to provide a continuous track signal to said delay line, with partial overlap of the successive track signal sections.

3. A video signal system, as in claim 2, in which said bypass circuit means include switching means; and pulsing means are provided, and are controlled by said timing means for controlling said switching means to close said bypass circuit for substantially the duration of said partial overlap of the track signal sections within the delay line.

4. A video signal system, as in claim 3, in which said switching means for the bypass circuit consist of transistor means.